United States Patent
Grundy et al.

[19]

[11] Patent Number: 5,948,135
[45] Date of Patent: Sep. 7, 1999

[54] BUSHING INSULATION AND FRAME ARRANGEMENT FOR MAKING FIBER GLASS

[75] Inventors: Reed H. Grundy; James W. Koewing, both of Murrysville, Pa.

[73] Assignee: PPG Industries Ohio, Inc., Cleveland, Ohio

[21] Appl. No.: 09/076,403

[22] Filed: May 12, 1998

[51] Int. Cl.$^6$ .................................................. C03B 37/08
[52] U.S. Cl. ............................................................ 65/495
[58] Field of Search ............................. 65/495, 533, 496, 65/497, 498, 499, 475

[56] References Cited

U.S. PATENT DOCUMENTS

| | | | |
|---|---|---|---|
| 2,255,578 | 9/1941 | Baker | 13/6 |
| 3,492,104 | 1/1970 | Glaser | 65/11 |
| 3,829,300 | 8/1974 | Shealy | 65/498 |
| 3,988,135 | 10/1976 | Coggin | 65/1 |
| 4,046,535 | 9/1977 | Stalego | 65/1 |
| 4,161,396 | 7/1979 | Greene | 65/497 |
| 4,167,403 | 9/1979 | Coggin | 65/1 |
| 4,330,311 | 5/1982 | Jensen | 65/1 |
| 4,332,602 | 6/1982 | Jensen | 65/12 |
| 5,078,182 | 1/1992 | Kraft | 138/147 |
| 5,147,431 | 9/1992 | Gaertner | 65/1 |
| 5,709,727 | 1/1998 | Bobba | 65/481 |

*Primary Examiner*—John Hoffmann
*Attorney, Agent, or Firm*—Dennis G. Millman

[57] ABSTRACT

A glass fiber forming bushing assembly wherein the bushing is supported by a frame is disclosed wherein portions of the frame are angled outwardly and downwardly. The result is a larger amount of insulating refractory between the bushing and the frame at the plane of the tip plate at the bottom of the bushing. This provides more uniform thermal conditions across the bushing. Structural integrity is provided by protrusions extending from the angled side frame portions into the refractory.

10 Claims, 1 Drawing Sheet

U.S. Patent
Sep. 7, 1999
5,948,135
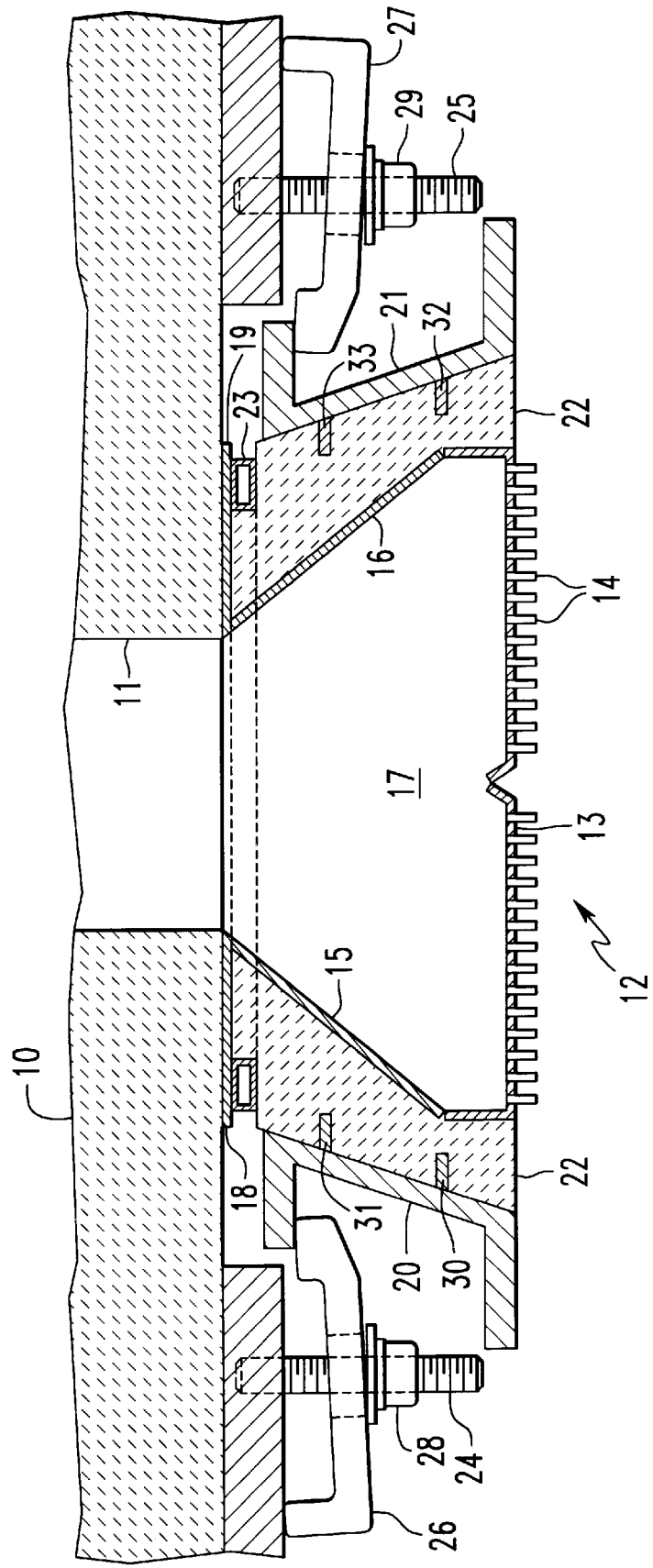

BUSHING INSULATION AND FRAME ARRANGEMENT FOR MAKING FIBER GLASS

BACKGROUND OF THE INVENTION

This invention is directed to a glass fiber forming bushing assembly. More specifically, the present invention is directed toward improving the uniformity of temperature conditions within such a bushing, which in turn improves the uniformity of fibers produced by the bushing.

In a typical direct melt forming operation, glass batch materials are heated in a large melting furnace and fed via a refiner to an elongated refractory-lined forehearth having a plurality of bushing assemblies connected to apertures in the bottom of the forehearth. Alternatively, molten glass may be supplied to a bushing by remelting glass agglomerates (e.g., "marbles"). The present invention has applicability to either type of operation. Glass fibers are formed at the bushing by attenuating streams of molten glass through orifices or nozzles ("tips") at the bottom of each bushing assembly.

In the formation of continuous glass fibers, various bushing support structures have been described in the prior art. Commonly, the bushing is supported against the underside of a source of molten glass by a separate frame. Because the bushing is usually heated electrically, the bushing is electrically insulated from the frame. The bushing is set into the frame by means of a castable refractory material that is poured into the space between the bushing and the frame before the assembly is mounted in the fiber forming station. The cast refractory surrounding the bushing also serves the important function of insulating the bushing against heat loss. Maintaining the rheology of the molten glass substantially uniform in all portions of the bushing has been an objective toward which various measures have been directed in the prior art for the sake of promoting unbroken production of filaments having uniform diameters from all portions of the bushing. Therefore, the industry has sought ways to minimize heat loss from the bushing and to maintain temperatures as uniform as possible at each of the filament forming orifices. In some cases, these efforts have not been as effective as would be desired.

In the fiber glass industry, it has been known to use bushings whose side walls taper outwardly toward the bottom. Such a design is useful for maximizing the number of fiber forming orifices on a bushing while minimizing the size of the opening in the bottom of the forehearth. U.S. Pat. No. 4,330,311 shows a typical bushing arrangement of that type. The combination of angled bushing walls with vertical frame members creates a wedge shaped mass of refractory around the bushing, with the thickness of the refractory, and therefore its insulating value, being greater at the top of the bushing, i.e., near the forehearth, relative to that near the bottom of the bushing. It has now been found that the non-uniform refractory thickness associated with this geometry results in localized heat transfer near the bottom of the bushing which has a significant negative effect on the uniformity of fiber forming conditions across the bushing. Additionally, in order to support the cast refractory vertically, the prior art, as typified by the aforesaid patent, sometimes placed a horizontal, inwardly extending flange at the bottom of the frame. This further exacerbates the non-uniform heat loss in the peripheral areas at the bottom of the bushing. It would be desirable if this thermal non-uniformity could be reduced without compromising the structural integrity of the mounting means for the bushing.

SUMMARY OF THE INVENTION

It has been found that frame geometry has a significant effect on thermal uniformity of molten glass in a fiber glass forming bushing, and that the effect is particularly significant at the plane of the bushing tip plate. This problem is addressed in the present invention by configuring the bushing support frame so as to increase the amount of insulation between the bushing and the frame at the plane of the tip plate. One way to accomplish this is to flare at least a portion of the frame structure outwardly in the downward direction. Such a configuration places a greater width of refractory insulation between the perimeter of the bushing tip plate and the frame structure, thereby beneficially reducing heat loss from the perimeter of the bushing tip plate. Although not so limited, the present invention is particularly useful for improving thermal uniformity in bushings whose side walls flare outwardly toward the bottom.

To accommodate the outwardly flaring frame arrangement, the present invention employs a specialized structure on the frame to affix the refractory insulation within the frame. Retaining the refractory by means of a flange at the bottom of the frame as in some prior art arrangements would not be satisfactory since it would negate the advantage of greater insulation in the region of the bushing tip plate. Therefore, the outwardly flaring frame members in the present invention include protrusions that extend into the refractory at locations spaced from the plane of the bushing tip plate.

BRIEF DESCRIPTION OF THE DRAWING

The drawing is a side elevation view, partly in cross-section, of a bushing and frame assembly of one embodiment of the present invention.

DETAILED DESCRIPTION

In a glass fiber forming operation, a glass melting furnace and forehearth convey a stream of molten fiberizable material to an outlet fitted with a metallic bushing attached to the bottom of the forehearth. This invention involves an improved structure for mounting the bushing to the forehearth. Melting furnace and forehearth construction are generally known in the industry, and a disclosure of their details is not necessary for an understanding of the present invention. Examples of prior art knowledge of forehearth construction can be seen in *The Manufacturing Technology of Glass Fibres*, (3d Ed.), K. Loewenstein (1993), pages 85–101.

The molten glass flows from the bottom of the bushing through a large number of orifices or "tips" in a tip plate where they are attenuated by a winder to form glass filaments of desired size. The filaments then may be contacted with an applicator to apply a sizing composition, gathered by a guide to form a sliver or strand, and wound about a collet of a winder. Examples of suitable sizing compositions and winders are set forth in Loewenstein (supra) at pages 186–194 and 237–287.

The preferred embodiment to be described herein is particularly adapted for the case in which the material from which the fibers are formed is glass, but it should be understood that the apparatus of the present invention may find utility in forming fibers from other fiberizable materials. As used herein, the term "fiberizable" means a material capable of being formed into a generally continuous filament by being drawn from an orifice or nozzle. As known to those of skill in the art, such materials include a variety of thermoplastic organic and inorganic materials (e.g., see *Encyclopedia of Polymer Science and Technology*, Vol. 6, John Wiley & Sons, 1967, at 506–507). Useful glass materials include any type of fiberizable glass composition known to those skilled in the art, such as "E-glass," "A-glass," "C-glass," "D-glass," "R-glass," "S-glass," and derivatives thereof as disclosed in Loewenstein (supra), pages 30–36.

Thus, the specific aspects of the preferred embodiment disclosed herein are directed to the portions of the fiber forming operation that contain the novel features of the present invention, i.e., the busing frame structure. The context in which this component appears and its operation will be readily apparent to those of skill in the art familiar with conventional fiber glass forming.

In the drawing there is shown a glass fiber forming station at the underside of a forehearth 10, which includes a bushing, generally designated as 12, mounted to the underside of the forehearth by means of a frame structure in accordance with the present invention. Molten glass flows through an opening 11 in the forehearth into the bushing 12. The design of bushing 12 may be conventional as to shape and construction, and the particular design shown is comprised of a generally planar tip plate 13 on the bottom carrying an array of glass fiber producing tips or nozzles 14 through which molten glass flows from the bushing. The overall shape of the tip plate 13 may vary, but typically it is a long rectangle (the short width dimension being shown in the drawing). The dimensions of the tip plate 13 can vary, but generally the length of a tip plate may range from about 25 to about 127 centimeters (about 10 to about 50 inches) and the width 50 ranges from about 6 to about 25 centimeters (about 2.5 to about 10 inches). Typically, a tip plate generally may have a thickness of about 1 to about 3 millimeters (about 0.04 to about 0.12 inches), preferably about 1 to about 2.5 millimeters (about 0.04 to about 0.1 inches). One skilled in the art would understand that the dimensions of the tip plate 13 can vary as desired. It should be understood that the spacing and number of tips 14 shown on the bushing in the drawing is merely schematic. The advantages of the present invention are particularly useful in conjunction with bushing designs that include larger than the average number of fiber forming tips.

The bushing includes opposing side walls 15 and 16 whose major areas angle outwardly from each other in the direction of molten glass flow, i.e., in the downward direction, so as to accommodate a tip plate 13 of considerably larger area than the opening 11 in the forehearth. Other bushing designs have substantially vertical walls, and their use in the present invention is not precluded. The angle at which the side wall portions are inclined from vertical is not critical, and typically may range from 0° to 45° from vertical. In the drawing, end walls 17, which need not be angled from vertical, complete the enclosure of the bushing. The side walls 15 and 16 and end walls 17 may be generally planar as shown, but curved shapes are feasible. At the upper edge of the bushing, flanges 18 and 19 extend generally horizontally to help support the bushing in the frame (to be described below) and to provide a sealing surface to prevent molten glass leakage. Suitable electrical connections (not shown) and suitable control means may also be provided to heat bushing 12. Electrical energy may be passed through the bushing in order to heat the bushing and the molten glass contained therein in an attempt to thermally condition the glass so that the fibers produced have an essentially uniform diameter. Nevertheless, in a conventional bushing, molten glass near the peripheral regions of the bushing tends to be hotter or cooler than molten glass in the central region, which contributes to fiber breakage and non-uniform filament diameters.

The components of the bushing 12, such as the side walls 15 and 16, end walls 17, and tip plate 13 are formed from a metallic material or alloys by conventional metalworking and processing techniques well known to those skilled in the art. The metallic material is resistant to corrosion by glass, non-contaminating toward the glass, oxidation resistant, and possesses uniform electrical resistance and resistance to creep (deformation under load, which is a function of stress). See Loewenstein (supra) at pages 122–126, for a discussion of typical art practices in this regard. Examples of suitable metallic materials for forming the components of the bushing 12 include platinum, rhodium and alloys thereof. Preferably, the metallic material is about a 10% to about 20% rhodium-platinum alloy, and more preferably about 10% rhodium-platinum alloy. The metallic materials can be dispersion strengthened or grain-stabilized to reduce creep, if desired. "ZGS" dispersion strengthened metallic plates are commercially available from Johnson Matthey, Wayne, Pa. A bushing embodiment as shown in the drawing may be formed by joining the walls and tip plate by welding. A suitable welding technique is the tungsten inert gas welding technique, which is well known to those skilled in the art.

The bushing 12 is removably affixed to the underside of the forehearth 10 by means of a rigid frame structure comprised of side members 20 and 21. The frame is spaced from the bushing, and the space is filled with a castable refractory material 22 as is conventionally used in the art. The exact configuration of the frame may vary considerably, but a suitable frame is generally characterized by structural rigidity greater than that of the bushing and comprises structural elements spaced from the bushing and substantially surrounding the bushing. Typically the frame is configured as an enclosed rectangle, but virtually any shape may suffice, and it is not required that the frame be an unbroken enclosure. By providing a frame of greater rigidity than the bushing, it is possible to reduce the thickness of the costly alloy in the bushing itself while maintaining structural integrity of the bushing and its connection to the forehearth. Although there is no limitation as to the material from which the frame may be fabricated, the function of providing structural rigidity is conveniently and economically served by fabricating the frame from structural cast iron or steel members such as channels or beams. In the prior art, these structural cast iron or steel members often were aligned with a substantially vertical orientation, regardless of the slope of the adjacent bushing side walls. As a result, the lower portion of the frame was often in closer proximity to the bushing than other portions of the frame. It has now been discovered that this geometric relationship between the frame and the bushing led to localized heat transfer from peripheral areas of the bushing tip plate to the adjacent portion of the frame. This, in turn could cause temperatures in peripheral regions of the tip plate to be lower than in central portions, which is undesirable for the sake of producing uniformly sized fibers. This problem is addressed by the present invention as will be more fully described below.

A cooling conduit 23 is generally cast into the upper portion of the refractory 22 near the bushing flanges 18 and 19. Flanges 18 and 19 and cooling conduit 23 are pressed against the underside of the forehearth by any suitable mechanical means such as the threaded shafts 24 and 25, clamps 26 and 27, and nuts 28 and 29 as shown in the drawing.

In the present invention, at least portions of the frame that face the outwardly angled walls of the bushing are also angled outwardly toward the bottom. Thus, in the embodiment shown in the drawing, frame members 20 and 21 are angled from vertical in the same direction as the adjacent bushing side walls 15 and 16 respectively. The angle at which the frame member is inclined from vertical need not be the same as that of the bushing side walls, but is sufficient to increase the width of the insulating refractory 22 at the plane of the tip plate 13 relative to a vertical frame orientation. In general, the angle at which the frame members 20 and 21 are inclined from vertical may preferably be within the range of 10° to 45°. Lesser angles are not excluded, but the advantages would be diminished. Greater angles are also possible, but the geometry of wider angles becomes awkward. It should be understood that when referring to the angle of a frame member, it is intended to refer to its major component with vertical extent facing the bushing, not any flanges or other incidental reinforcement elements.

The bushing is supported within the refractory 22 by virtue of flanges 18 and 19 resting upon the upper side of the refractory. However, the downwardly opening shape of the frame in the present invention requires measures to be taken to secure the refractory within the frame. Accordingly, there are provided anchor means on the inside faces of frame members 20 and 21. These anchor means may take the form of protrusions that extend from the frame member into the refractory 22 so as to impede the refractory from being released from the frame. The protrusions may take a wide variety of forms. In the particular embodiment shown in the drawing, the protrusions are in the form of ribs 30, 31, 32, and 33. Two ribs are shown on each side of the frame, but it should be understood that one on each side may be sufficient. It is advantageous for the sake of maximizing the extent to which they engage the refractory for the ribs to extend substantially the entire length of the frame members 20 and 21, but it should be apparent that the extent could be substantially less. Instead of continuous ribs, the protrusions could be a number of discrete tabs or pins or the like. The protrusions may be welded or otherwise affixed to the frame members, or they constitute integral flanges or the like of the stock material from which the frame is made. The ribs 30, 31, 32, and 33 are shown extending substantially horizontally, which optimizes their grip on the refractory 22, but it should be understood that the ribs or any other embodiment of protrusions could extend at an upward or downward angle from horizontal.

Unlike the bottom frame flanges in some prior art arrangements, the protrusions of the present invention are spaced a substantial distance from the plane of the tip plate 13 so as not to reduce the enhanced insulation provided by the angled frame and the resulting enlarged refractory width. Therefore, it is expedient for the protrusions to be spaced from the plane of the tip plate 13 a distance at least as great as the width of the refractory 22 at that plane.

Specific embodiments have been set forth with detail herein for the sake of disclosing the best mode of the invention, but it should be understood that other variations and modifications that would be evident to those of skill in the art are encompassed by the invention as defined by the claims.

We claim:

1. A glass fiber forming bushing assembly comprising: a bushing for receiving molten glass, said bushing including a tip plate having orifices adapted to pass glass to form filaments; said bushing having side walls extending upwardly from the periphery of the tip plate and defining a channel for directing molten glass from a source to the tip plate; a support frame for the bushing having side members spaced from and facing at least portions of the bushing side walls, refractory material between the bushing side walls and the side frame members, the portion of the frame facing the bushing side walls being angled from vertical so as to be spaced farther from the center of the bushing at the bottom than at the top, the angled side frame portion carrying protrusions extending in the direction of the bushing into the refractory a sufficient distance to anchor the refractory in place, the plane of the tip plate being substantially free of heat conductive protrusions from the frame toward the bushing.

2. The apparatus of claim 1 wherein at least a portion of said side walls of the bushing are angled from vertical such that said channel is broader at the tip plate than at a distance spaced above the tip plate.

3. The apparatus of claim 1 wherein the protrusions are elongated ribs.

4. The apparatus of claim 1 wherein the protrusions extend into the refractory in a substantially horizontal direction.

5. The apparatus of claim 1 wherein each frame member provided with protrusions is provided with a plurality of protrusions.

6. The apparatus of claim 1 wherein the bushing side walls and the frame side members are angled from horizontal at different angles.

7. The apparatus of claim 1 wherein the protrusions are spaced from the plane of the tip plate a distance at least as great as a width of refractory at that plane.

8. The apparatus of claim 1 wherein the protrusions are spaced from the bushing side walls a distance at least as great as a width of refractory at the plane of the tip plate.

9. The apparatus of claim 1 wherein the refractory is a cast refractory and is cast into place so as to substantially cover said protrusions.

10. The apparatus of claim 1 wherein the refractory is electrically and thermally insulative.

* * * * *